United States Patent
Chen et al.

(10) Patent No.: US 10,199,948 B2
(45) Date of Patent: Feb. 5, 2019

(54) STANDBY POWER CONTROL FOR A FLYBACK USB DEVICE USING PRIMARY SIDE FREQUENCY AND DATA PORT SENSING

(71) Applicant: Leadtrend Technology Corp., Hsinchu County (TW)

(72) Inventors: Yao-Tsung Chen, Hsinchu County (TW); Mao-Shih Li, Hsinchu County (TW); San-Yi Li, Hsinchu County (TW); Hung-Ching Lee, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/965,996

(22) Filed: Apr. 30, 2018

(65) Prior Publication Data

US 2018/0323722 A1    Nov. 8, 2018

(30) Foreign Application Priority Data

May 5, 2017  (TW) .............................. 106114958 A (51) Int. Cl.
*H02M 3/335*    (2006.01)
(52) U.S. Cl.
CPC ... *H02M 3/33561* (2013.01); *H02M 3/33523* (2013.01)

(58) Field of Classification Search
CPC ........................................... H02M 3/335–3/42
See application file for complete search history.

(56) References Cited

U.S. PATENT DOCUMENTS

| | | | |
|---|---|---|---|
| 2012/0169316 A1* | 7/2012 | Guthrie | H02M 3/33523 323/301 |
| 2017/0155331 A1* | 6/2017 | Lee | H02M 3/33523 |
| 2017/0308152 A1* | 10/2017 | Trichy | G06F 13/4282 |
| 2017/0346411 A1* | 11/2017 | Yao | H02M 3/33576 |
| 2017/0353115 A1* | 12/2017 | Kim | H02M 3/33523 |

* cited by examiner

*Primary Examiner* — Kyle J Moody
*Assistant Examiner* — Peter Novak
(74) *Attorney, Agent, or Firm* — Winston Hsu (57) ABSTRACT

A secondary controller applied to a secondary side of a power converter includes a detector and a standby signal generation circuit. The detector is used for detecting a first signal and a second signal of a universal serial bus device, and a frequency of a synchronization signal corresponding to a primary side of the power converter. The standby signal generation circuit is coupled to the detector for delaying a first predetermined time to generate a standby signal to a primary controller of the primary side of the power converter when the detector fails to detect the first signal and the second signal, and the frequency of the synchronization signal is less than a first predetermined frequency, wherein the primary controller enters a standby mode according to the standby signal.

23 Claims, 10 Drawing Sheets

STANDBY POWER CONTROL FOR A FLYBACK USB DEVICE USING PRIMARY SIDE FREQUENCY AND DATA PORT SENSING

BACKGROUND OF THE INVENTION

1. Field of the Invention

The present invention relates to a secondary controller applied to a secondary side of a power converter and an operation method thereof, and particularly to a secondary controller and an operation method thereof that can utilize a standby mode to make power consumption of the power converter, the secondary controller, and a primary controller applied to a primary side of the power converter when a universal serial bus device is disconnected to the secondary controller.

2. Description of the Prior Art

When a secondary controller applied to a secondary side of a power converter is coupled to a universal serial bus device, the power converter, the secondary controller, and a primary controller applied to a primary side of the power converter can operate in a normal mode. However, when the universal serial bus device is disconnected to the secondary controller, the secondary controller and the primary controller still operate in the normal mode although the primary controller can make the power converter operate at a lower switching frequency, so power consumption of the secondary controller and the primary controller will be not reduced because the universal serial bus device is disconnected to the secondary controller. Therefore, how to reduce the power consumption of the secondary controller and the primary controller after the universal serial bus device is disconnected to the secondary controller becomes an important power-saving issue.

SUMMARY OF THE INVENTION

An embodiment of the present invention provides a secondary controller applied to a secondary side of a power converter. The secondary controller includes a detector and a standby signal generation circuit. The detector is used for detecting a first signal and a second signal of a universal serial bus (USB) device and a frequency of a synchronization signal corresponding to a primary side of the power converter. The standby signal generation circuit is coupled to the detector for delaying a first predetermined time to generate a standby signal to a primary controller of the primary side of the power converter when the detector fails to detect the first signal and the second signal, and the frequency of the synchronization signal is less than a first predetermined frequency, wherein the primary controller enters a standby mode according to the standby signal.

Another embodiment of the present invention provides an operation method of a secondary controller applied to a secondary side of a power converter, wherein the secondary controller includes a detector, a standby signal generation circuit, and a comparator. The operation method includes the detector detecting a first signal and a second signal of a universal serial bus device and a frequency of a synchronization signal corresponding to a primary side of the power converter; and the standby signal generation circuit delaying a first predetermined time to generate a standby signal to a primary controller of the primary side of the power converter when the detector fails to detect the first signal and the second signal, and the frequency of the synchronization signal is less than a first predetermined frequency, wherein the primary controller enters a standby mode according to the standby signal.

The present invention provides a secondary controller applied to a secondary side of a power converter and an operation method thereof. The secondary controller and the operation method can determine a universal serial bus device is disconnected to the secondary controller when a detector of the secondary controller fails to detect a first signal and a second signal of the universal serial bus device, and the detector of the secondary controller detects that a frequency of a synchronization signal corresponding to a primary side of the power converter is less than a first predetermined frequency. After the secondary controller and the operation method determines that the universal serial bus device is disconnected to the secondary controller, the secondary controller and the operation method can make the secondary controller and the primary controller enter a standby mode, wherein after the secondary controller and the primary controller enter the standby mode, the secondary controller and the primary controller only turn on circuits relative to the standby mode. Therefore, compared to the prior art, because after the secondary controller and the primary controller enter the standby mode, the secondary controller and the primary controller only turn on the circuits relative to the standby mode, when the universal serial bus device is disconnected to the secondary controller, the present invention can utilize the standby mode to make power consumption of the power converter, the primary controller, and the secondary controller be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
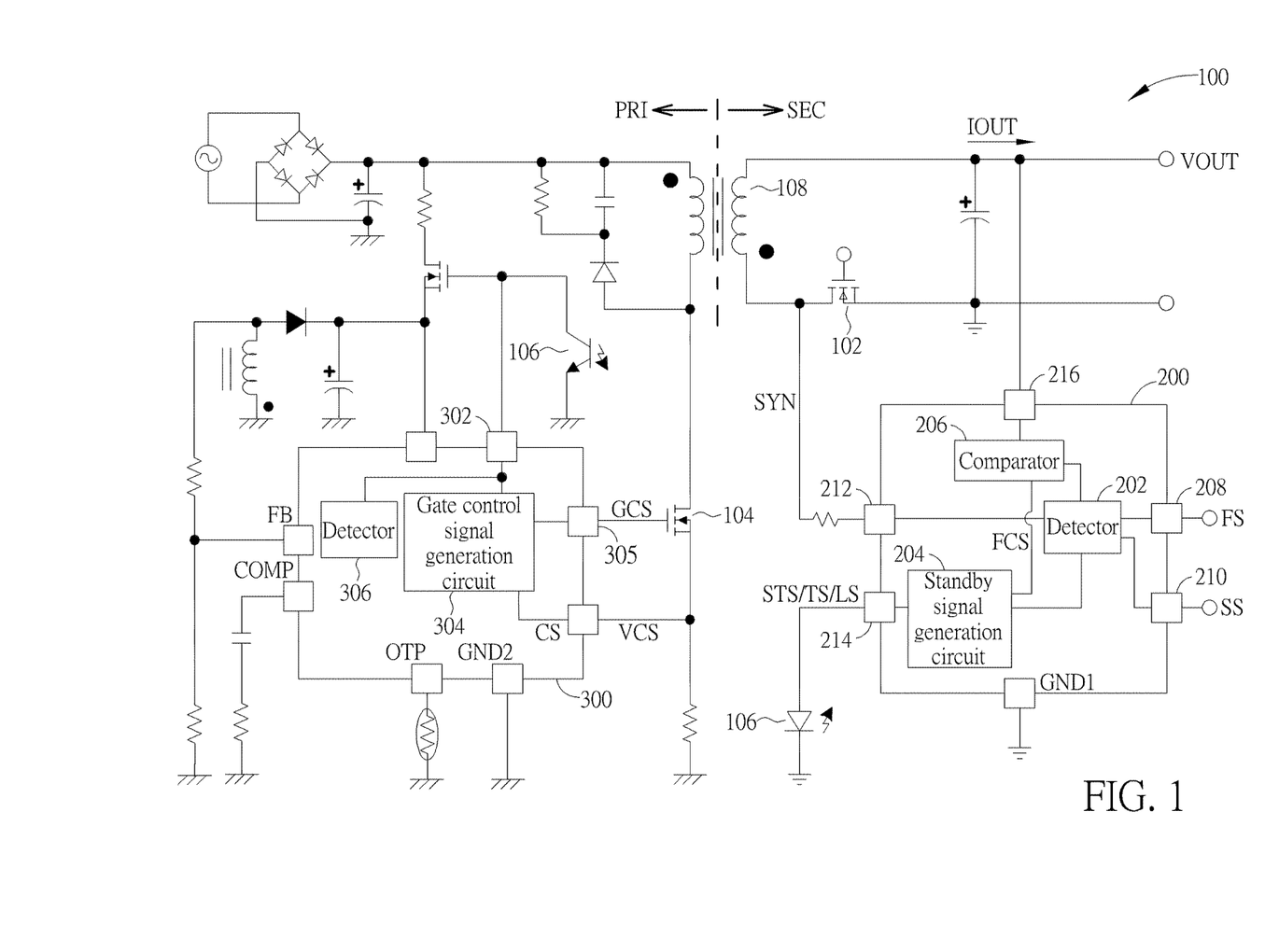
FIG. 1 is a diagram illustrating a secondary controller applied to a secondary side of a power converter according to a first embodiment of the present invention.

Please refer to FIG. 1. FIG. 1 is a diagram illustrating a secondary controller 200 applied to a secondary side SEC of a power converter 100 according to a first embodiment of the present invention, wherein the power converter 100 is an alternating current/direct current power converter. As shown in FIG. 1, the secondary controller 200 includes a detector 202, a standby signal generation circuit 204, and a comparator 206, wherein the standby signal generation circuit 204 is coupled to the detector 202, and the comparator 206 is coupled to the detector 202 and the standby signal generation circuit 204. As shown in FIG. 1, the detector 202 is used for detecting a first signal FS and a second signal SS of a universal serial bus (USB) device through pins 208, 210 of the secondary controller 200 respectively, wherein the first signal FS and the second signal SS are a differential signal pair. For example, the first signal FS and the second signal SS can be a differential signal pair Data+, Data− of an A type of USB 2.0 (or a B type of USB 2.0), respectively. But, in another embodiment of the present invention, the first signal FS and the second signal SS can be a differential signal pair Data+, Data− (or a Superspeed transmitter differential signal pair StdB_SSTX+, StdB_SSTX−, or a Superspeed receiver differential signal pair StdB_SSRX+, StdB_SSRX−) of an A type of USB 3.x (or a B type of USB 3.x) respectively, wherein x is 0 or 1. In addition, in another embodiment of the present invention, the first signal FS and the second signal SS can be a differential signal pair Dp1, Dn1 (or a Superspeed transmitter differential signal pair SSTXp1, SSTXn1, or a Superspeed receiver differential signal pair SSRXp1, SSRXn1) of a C type of USB 3.1. In addition, as shown in FIG. 1, the detector 202 is also used for detecting a frequency of a synchronization signal SYN corresponding to a primary side PRI of the power converter 100 through a pin 212 of the secondary controller 200 coupled to a drain of a synchronous switch 102 of the secondary side SEC of the power converter 100, wherein the synchronous switch 102 can ensure that the primary side PRI of the power converter 100 and the secondary side SEC of the power converter 100 are not turned on simultaneously.

Figure 2:
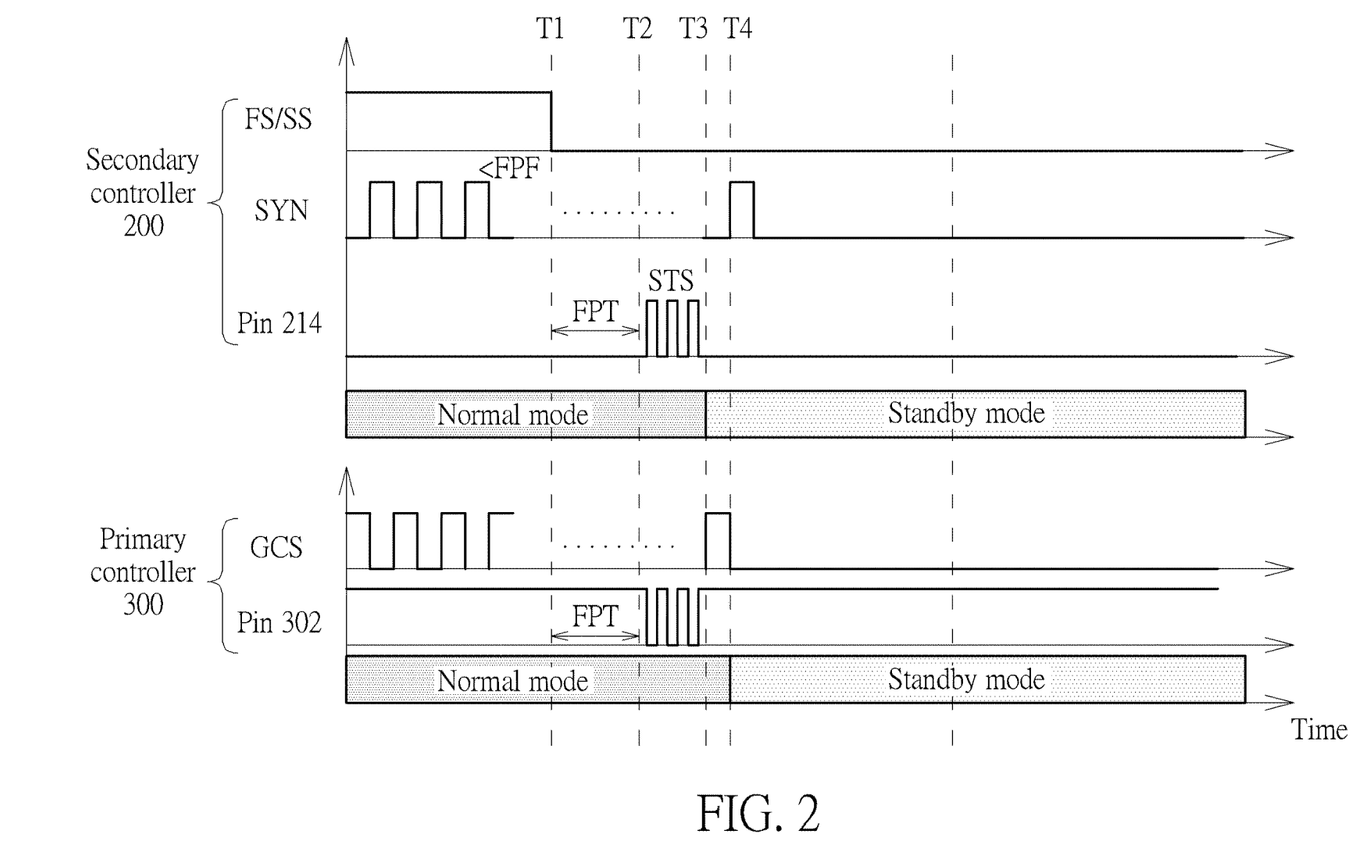
FIG. 2 is a diagram illustrating operation timings of the primary controller and the secondary controller when the primary controller and the secondary controller enter the standby mode from the normal mode.

As shown in FIG. 1, when the secondary controller 200 is coupled to the universal serial bus device (not shown in FIG. 1), the secondary controller 200 and a primary controller 300 applied to the primary side PRI of the power converter 100 can make the power converter 100 operate in a normal mode. However, as shown in FIG. 2, when the universal serial bus device is disconnected to the secondary controller 200 at a time point T1, the detector 202 will fail to detect the first signal FS and the second signal SS of the universal serial bus device. Meanwhile, because the secondary side SEC of the power converter 100 is not coupled to the universal serial bus device, a frequency of a gate control signal GCS is reduced (wherein the gate control signal GCS is used for controlling turning-on and turning off of a power switch 104 of the primary side PRI of the power converter 100), and because the synchronization signal SYN corresponds to the gate control signal GCS, the frequency of the synchronization signal SYN is also reduced as the frequency of the gate control signal GCS is reduced. As shown in FIG. 2, when the detector 200 detects that the frequency of the synchronization signal SYN is less than a first predetermined frequency FPF, the standby signal generation circuit 204 will delay a first predetermined time FPT to generate a standby signal STS at a time point T2, wherein the standby signal STS is transmitted to the primary controller 300 through a pin 214 and a photocoupler 106 of the secondary controller 200, the first predetermined time FPT is used for preventing the standby signal generation circuit 204 from generating the standby signal STS because the standby signal generation circuit 204 is triggered by mistake, and the standby signal STS is a digital signal. But, in another embodiment of the present invention, the standby signal STS is an analog signal or a mixed-mode signal. In addition, as shown in FIG. 2, because the standby signal STS is transmitted to the primary controller 300 through the pin 214 and the photocoupler 106, a pin 302 of the primary controller 300 can receive a corresponding signal corresponding to the standby signal STS. As shown in FIG. 2, after the secondary controller 200 generates the standby signal STS, the secondary controller 200 enters a standby mode at a time point T3, and after the secondary controller 200 enters the standby mode, the secondary controller 200 will turn off circuits within the secondary controller 200 other than the detector 202, the standby signal generation circuit 204, and the comparator 206. In addition, the first predetermined frequencies FPF can be determined by a minimum operation frequency of the gate control signal GCS when the power converter 100 operates in the normal mode. For example, the first predetermined frequency FPF can be 1.5-2 times to the minimum operation frequency (e.g. 1.5 KHz) of the gate control signal GCS, wherein the minimum operation frequency of the gate control signal GCS is used for improving an output voltage VOUT of the secondary side SEC of the power converter 100 floating high when the secondary side SEC of the power converter 100 is not coupled to a load. But, the present invention is not limited to the minimum operation frequency of the gate control signal GCS being 1.5 KHz.

In addition, as shown in FIG. 2, after the standby signal generation circuit 204 generates the standby signal STS, because the output voltage VOUT of the secondary side SEC of the power converter 100 is controlled by the secondary controller 200, a gate control signal generation circuit 304 of the primary controller 300 can generate the gate control signal GCS to boost the output voltage VOUT before the primary controller 300 enters the standby mode according to the standby signal STS, wherein the gate control signal GCS is transmitted to the power switch 104 through a pin 305 of the primary controller 300. Therefore, as shown in FIG. 2, the primary controller 300 will enter the standby mode at a time point T4.

Figure 3:
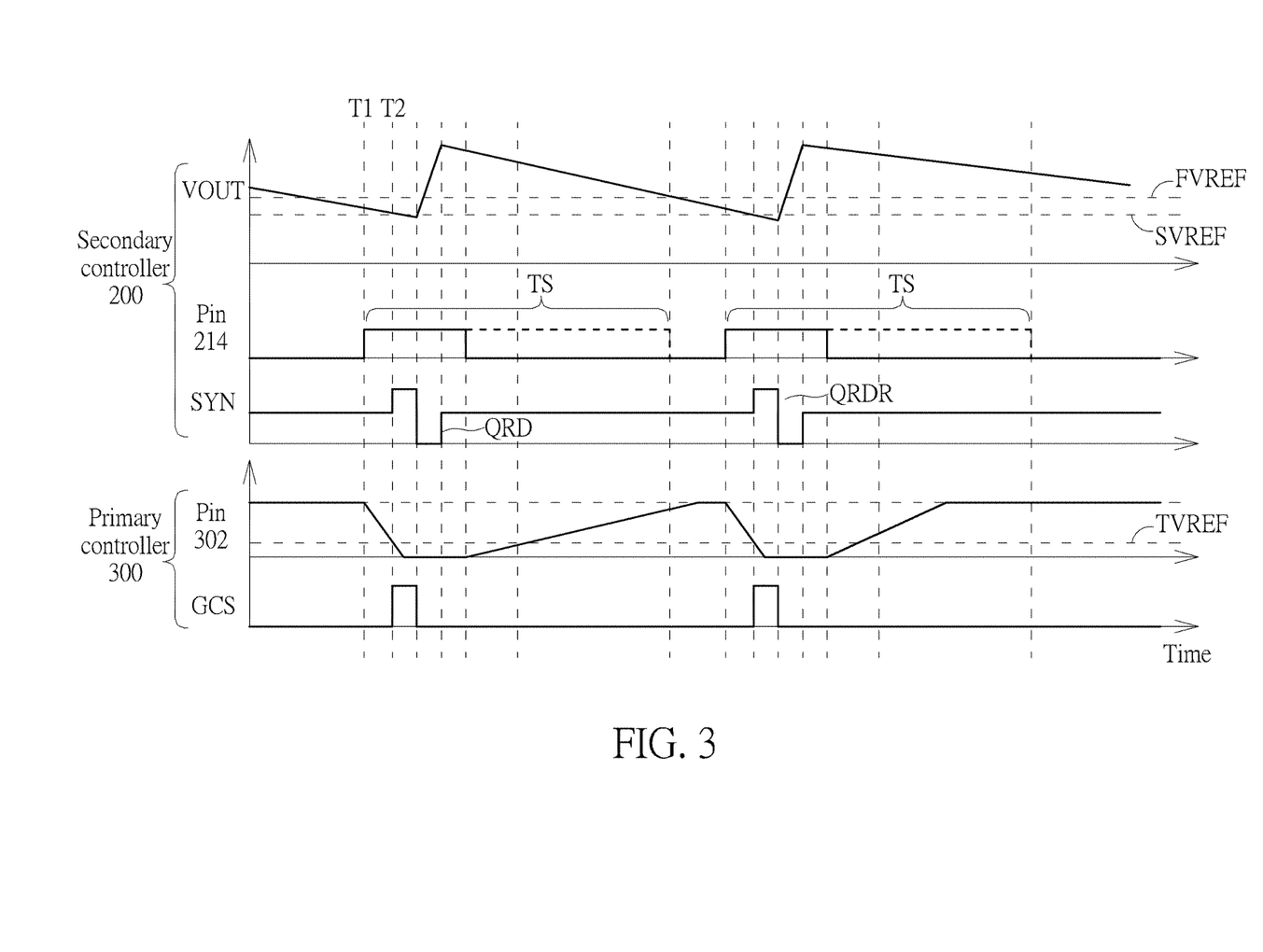
FIG. 3 is diagram illustrating operation timings of the primary controller and the secondary controller after the primary controller and the secondary controller enter the standby mode.

Please refer to FIG. 3. FIG. 3 is diagram illustrating operation timings of the primary controller 300 and the secondary controller 200 after the primary controller 300 and the secondary controller 200 enter the standby mode. As shown in FIG. 3, after the secondary controller 200 enters the standby mode, the comparator 206 can compare the output voltage VOUT with a first reference voltage FVREF (e.g. 4.9V or 5.1V) and compare the output voltage VOUT with a second reference voltage SVREF (e.g. 4.8V) until the detector 200 detects a falling edge QRDR of the synchronization signal SYN after the detector 202 detects the rising edge QRD of the synchronization signal SYN. But, the present invention is not limited to the first reference voltage FVREF being 4.9V or 5.1V, and the second reference voltage SVREF being 4.8V. Therefore, as shown in FIG. 3, at a time point T1, when the output voltage VOUT is less than the first reference voltage FVREF and greater than the second reference voltage SVREF, the comparator 206 generates a comparison signal FCS to the standby signal generation circuit 204, and the standby signal generation circuit 204 generates a turning-on signal TS according to the comparison signal FCS, wherein the turning-on signal TS is transmitted to the primary controller 300 through the pin 214 and the photocoupler 106 of the secondary controller 200, and as shown in FIG. 3, the turning-on signal TS has a predetermined duty cycle. In addition, a function of the turning-on signal TS is used for keeping the output voltage VOUT of the secondary side SEC of the power converter 100. As shown in FIG. 3, after the pin 302 of the primary controller 300 receives the corresponding signal corresponding to the turning-on signal TS, when the corresponding signal corresponding to the turning-on signal TS is less than a third reference voltage TVREF (at a time point T2), the gate control signal generation circuit 304 will generate the gate control signal GCS to the power switch 104, wherein enabling time of the gate control signal GCS corresponding to the time point T2 shown in FIG. 3 can make a detection voltage VCS of the primary side PRI of the power converter 100 be a minimum value (e.g. 0.3V), and the frequency of the gate control signal GCS in the standby mode is dozens of hertz.

Figure 4:
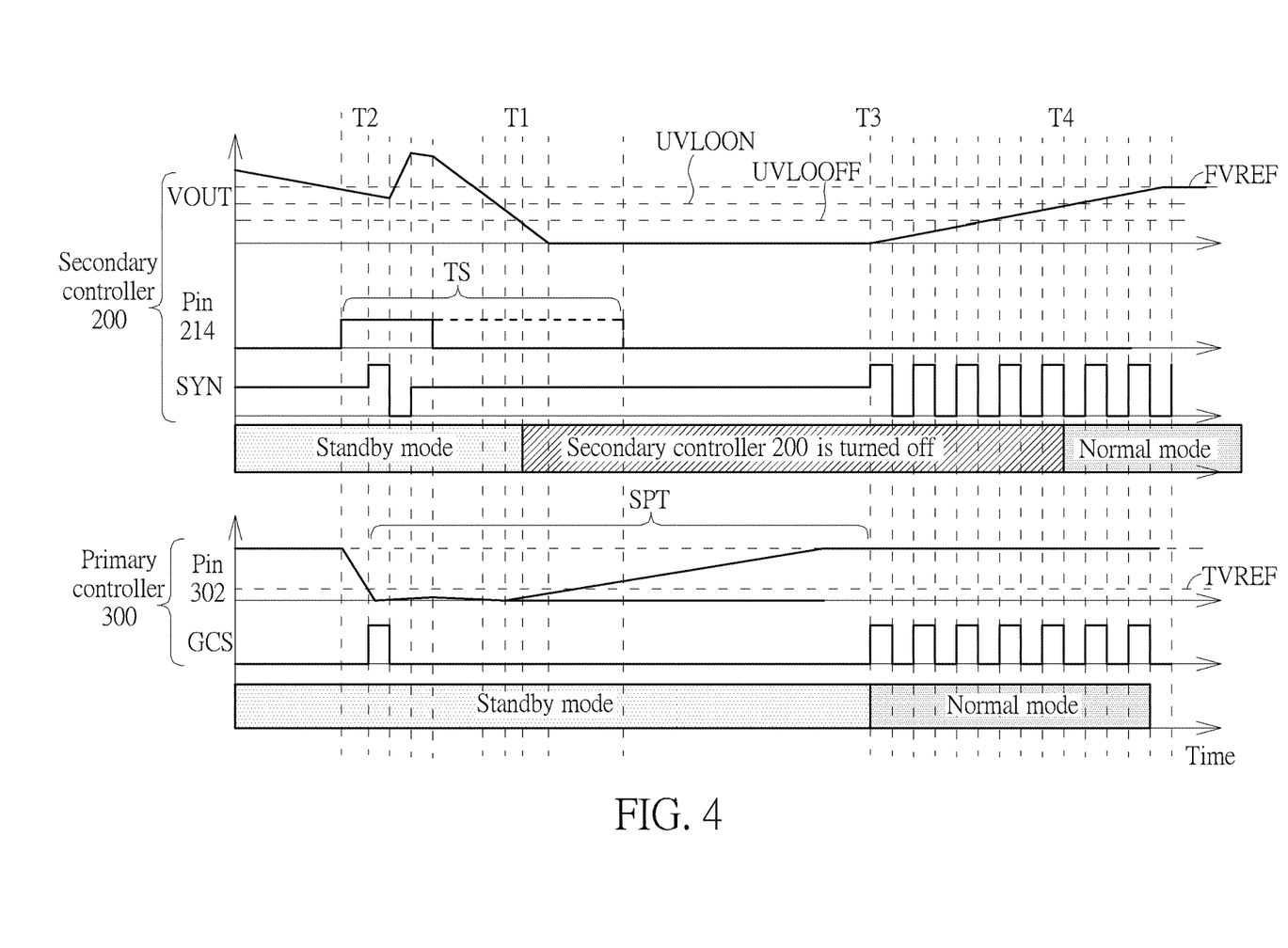
FIGS. 4-8 are diagrams illustrating operation timings of the primary controller 300 and the secondary controller 200 when the primary controller 300 and the secondary controller 200 enter the normal mode from the standby mode.

Please refer to FIG. 4. FIG. 4 is diagram illustrating operation timings of the primary controller 300 and the secondary controller 200 when the primary controller 300 and the secondary controller 200 enter the normal mode from the standby mode. As shown in FIG. 4, after the primary controller 300 and the secondary controller 200 enter the standby mode, if the output voltage VOUT is less than a under voltage lock out turning-off voltage UVLOOFF at a time point T1, the secondary controller 200 is turned off. Therefore, as shown in FIG. 4, after the gate control signal generation circuit 304 generates the gate control signal GCS to the power switch 104 at a time point T2 (because the corresponding signal corresponding to the turning-on signal TS on the pin 302 is less than the third reference voltage TVREF), if a detector 306 of the primary controller 300 fails to detect the corresponding signal corresponding to the turning-on signal TS generated by the standby signal generation circuit 204 within a second predetermined time SPT (e.g. 1 second) after the gate control signal generation circuit 304 generates the gate control signal GCS, the primary controller 300 will leave the standby mode to enter the normal mode at a time point T3, wherein the second predetermined time SPT can be determined by a winding 108 of the secondary side SEC of the power converter 100, the output voltage VOUT, and an output current IOUT. As shown in FIG. 4, after the primary controller 300 enters the normal mode, the output voltage VOUT starts to be increased. At a time point T4, when the output voltage VOUT is greater than a under voltage lock out turning-on voltage UVLOON, the secondary controller 200 is turned on to enter the normal mode again. In addition, after the primary controller 300 enters the standby mode, the primary controller 300 will turn off circuits within the primary controller 300 other than the detector 306 and the gate control signal generation circuit 304. That is to say, the primary controller 300 will turn off circuits within the primary controller 300 irrelative to the standby mode. For example, as shown in FIG. 1, the primary controller 300 will turn off circuits (not shown in FIG. 1) within the primary controller 300 coupled to a feedback pin FB, a compensation pin COMP, an over-temperature protection pin OTP, and a current detection pin CS, wherein potential of ground GND2 applied to the primary controller 300 is equal to (or different from) potential of ground GND1 applied to the secondary controller 200.

Figure 5:
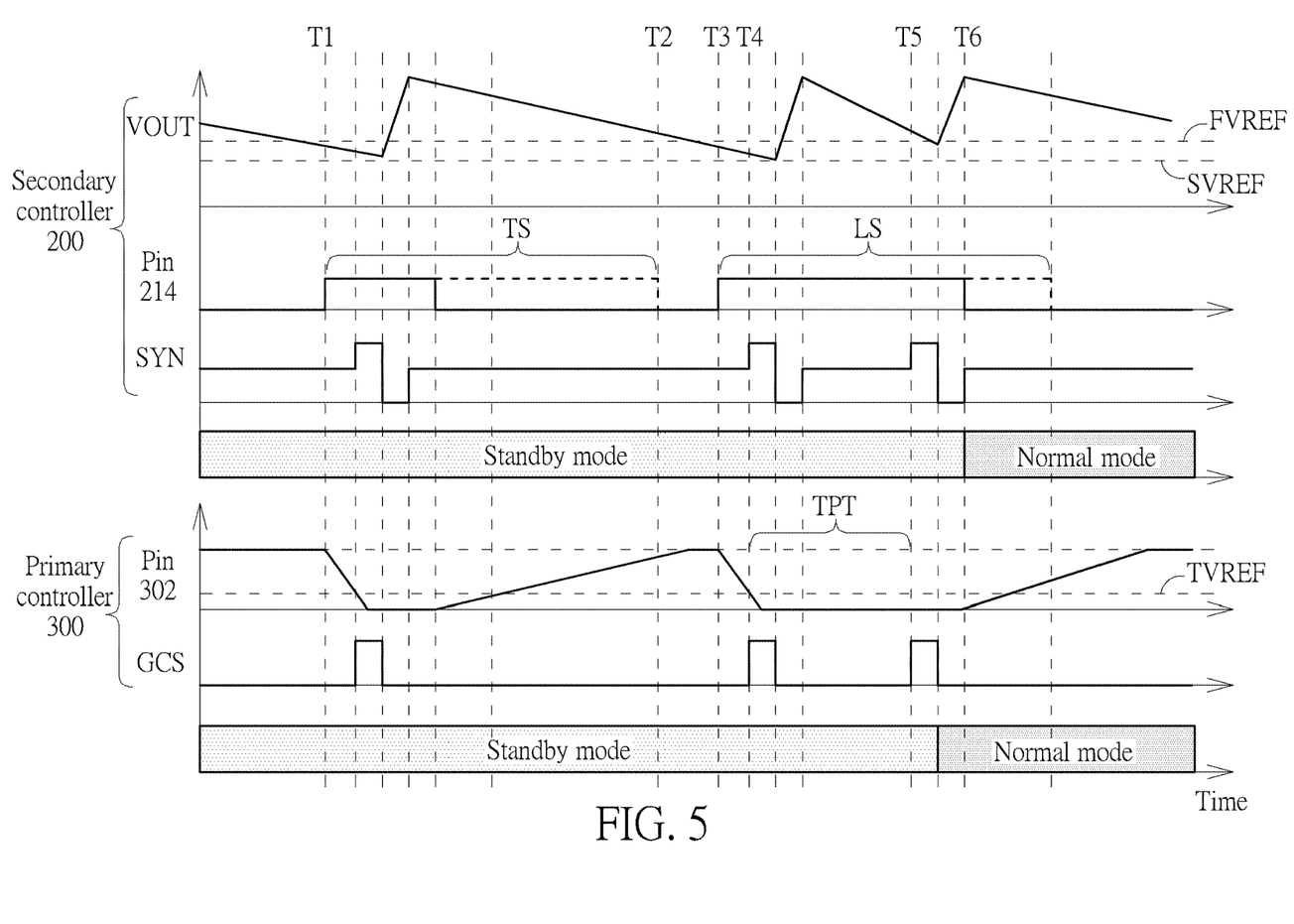

Please refer to FIG. 5. FIG. 5 is diagram illustrating operation timings of the primary controller 300 and the secondary controller 200 when the primary controller 300 and the secondary controller 200 enter the normal mode from the standby mode. As shown in FIG. 5, after the primary controller 300 and the secondary controller 200 enter the standby mode, when the output voltage VOUT is between the first reference voltage FVREF and the second reference voltage SVREF and the frequency of the synchronization signal SYN is greater than a second predetermined frequency (e.g. 10 KHz), because that the frequency of the synchronization signal SYN is greater than the second predetermined frequency represents the secondary side SEC of the power converter 100 being coupled to a load, the standby signal generation circuit 204 of the secondary controller 200 can generate a leaving signal LS at a time point T3, wherein the leaving signal LS is transmitted to the primary controller 300 through the pin 214 and the photo-coupler 106 of the secondary controller 200, and the second predetermined frequency can be determined by a time point T1 and a time point T2. In addition, as shown in FIG. 5, the leaving signal LS has a maximum enabling time and an enabling time of the leaving signal LS is greater than an enabling time of the turning-on signal TS. But, the present invention is not limited to the second predetermined frequency being 10 KHz. As shown in FIG. 5, after the pin 302 of the primary controller 300 receives a corresponding signal corresponding to the leaving signal LS, when the corresponding signal corresponding to the leaving signal LS on the pin 302 is less than the third reference voltage TVREF (at a time point T4), the gate control signal generation circuit 304 can generate the gate control signal GCS to the power switch 104. As shown in FIG. 5, when the corresponding signal corresponding to the leaving signal LS is less than the third reference voltage TVREF for a third predetermined time TPT (wherein the third predetermined time TPT is less than the maximum enabling time of the leaving signal LS and is not less than length of the turning-on signal TS), the gate control signal generation circuit 304 can generate the gate control signal GCS at a time point T5 and the primary controller 300 leaves the standby mode to enter the normal mode according to the gate control signal GCS corresponding to the time point T5. Meanwhile, because the detector 202 of the secondary controller 200 also detects the synchronization signal SYN corresponding to the time point T5, the standby signal generation circuit 204 can disable the leaving signal LS at a time point T6 according to the synchronization signal SYN corresponding to the time point T5. In addition, after the standby signal generation circuit 204 disables the leaving signal LS, the secondary controller 200 enters the normal mode from the standby mode.

Figure 6:
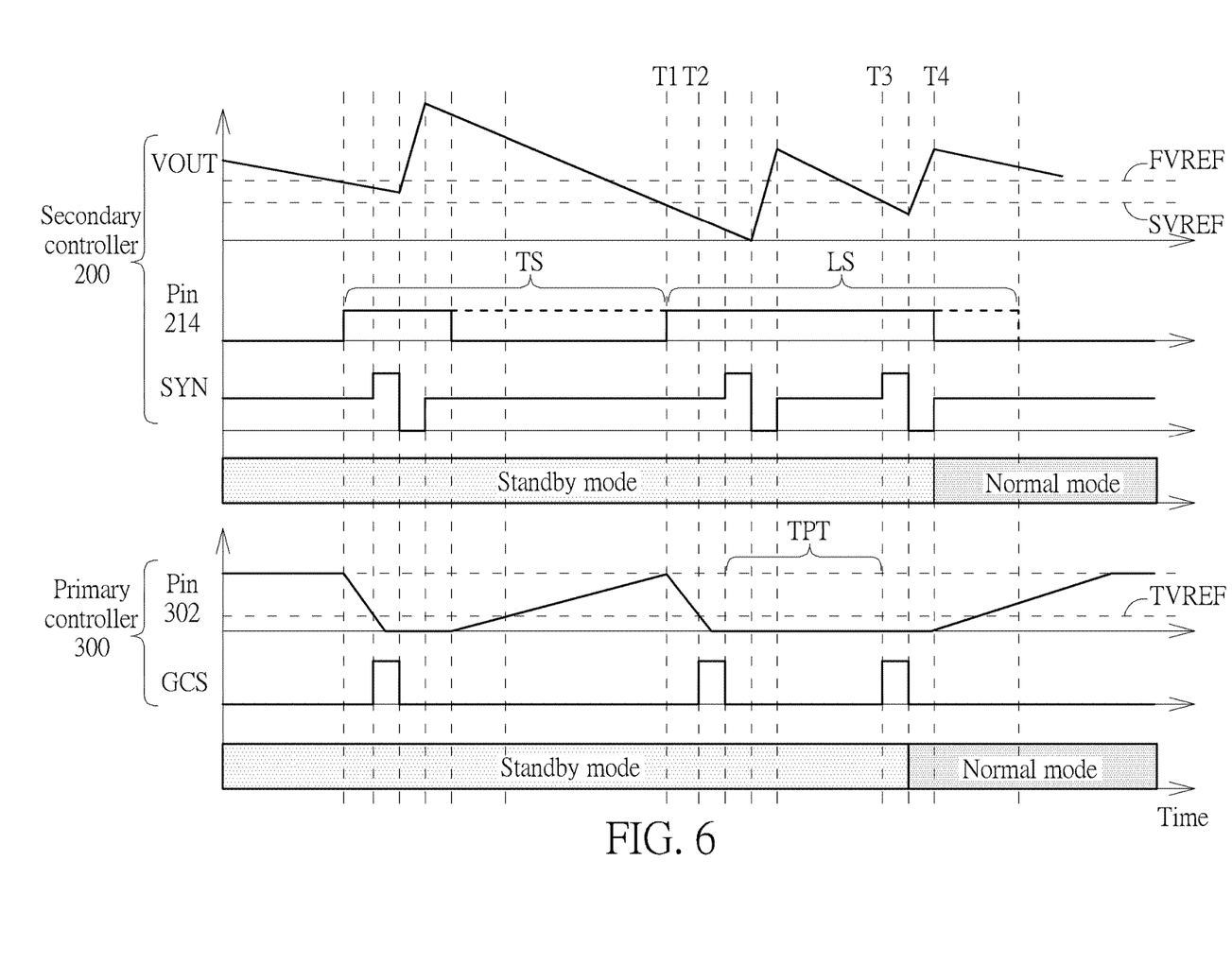

Please refer to FIG. 6. FIG. 6 is diagram illustrating operation timings of the primary controller 300 and the secondary controller 200 when the primary controller 300 and the secondary controller 200 enter the normal mode from the standby mode. As shown in FIG. 6, after the primary controller 300 and the secondary controller 200 enter the standby mode, if the output voltage VOUT is less than the second reference voltage SVREF within the turning-on signal TS, because that the output voltage VOUT is less than the second reference voltage SVREF represents the secondary side SEC of the power converter 100 being coupled to a heavy load (because the heavy load can make the output voltage VOUT be decreased rapidly), the standby signal generation circuit 204 of the secondary controller 200 will generate the leaving signal LS to the primary controller 300 after the turning-on signal TS (that is, at the time point T1). That is to say, if the output voltage VOUT is less than the second reference voltage SVREF within the turning-on signal TS, the standby signal generation circuit 204 still generates the leaving signal LS to the primary controller 300 after the turning-on signal TS (that is, at the time point T1). As shown in FIG. 6, after the pin 302 of the primary controller 300 receives the corresponding signal corresponding to the leaving signal LS, when the corresponding signal corresponding to the leaving signal LS on the pin 302 is less than the third reference voltage TVREF (a time point T2), the gate control signal generation circuit 304 generates the gate control signal GCS to the power switch 104. As shown in FIG. 6, when the corresponding signal corresponding to the leaving signal LS is less than the third reference voltage TVREF for the third predetermined time TPT, the gate control signal generation circuit 304 generates the gate control signal GCS at a time point T3 and the primary controller 300 enters the normal mode from the standby mode according to the gate control signal GCS corresponding to the time point T3. Meanwhile, because the detector 202 of the secondary controller 200 also detects the synchronization signal SYN corresponding to the time point T3, the standby signal generation circuit 204 disables the leaving signal LS at a time point T4 according to the synchronization signal SYN corresponding to the time point T3. In addition, after the standby signal generation circuit 204 disables the leaving signal LS, the secondary controller 200 enters the normal mode from the standby mode.

Figure 7:
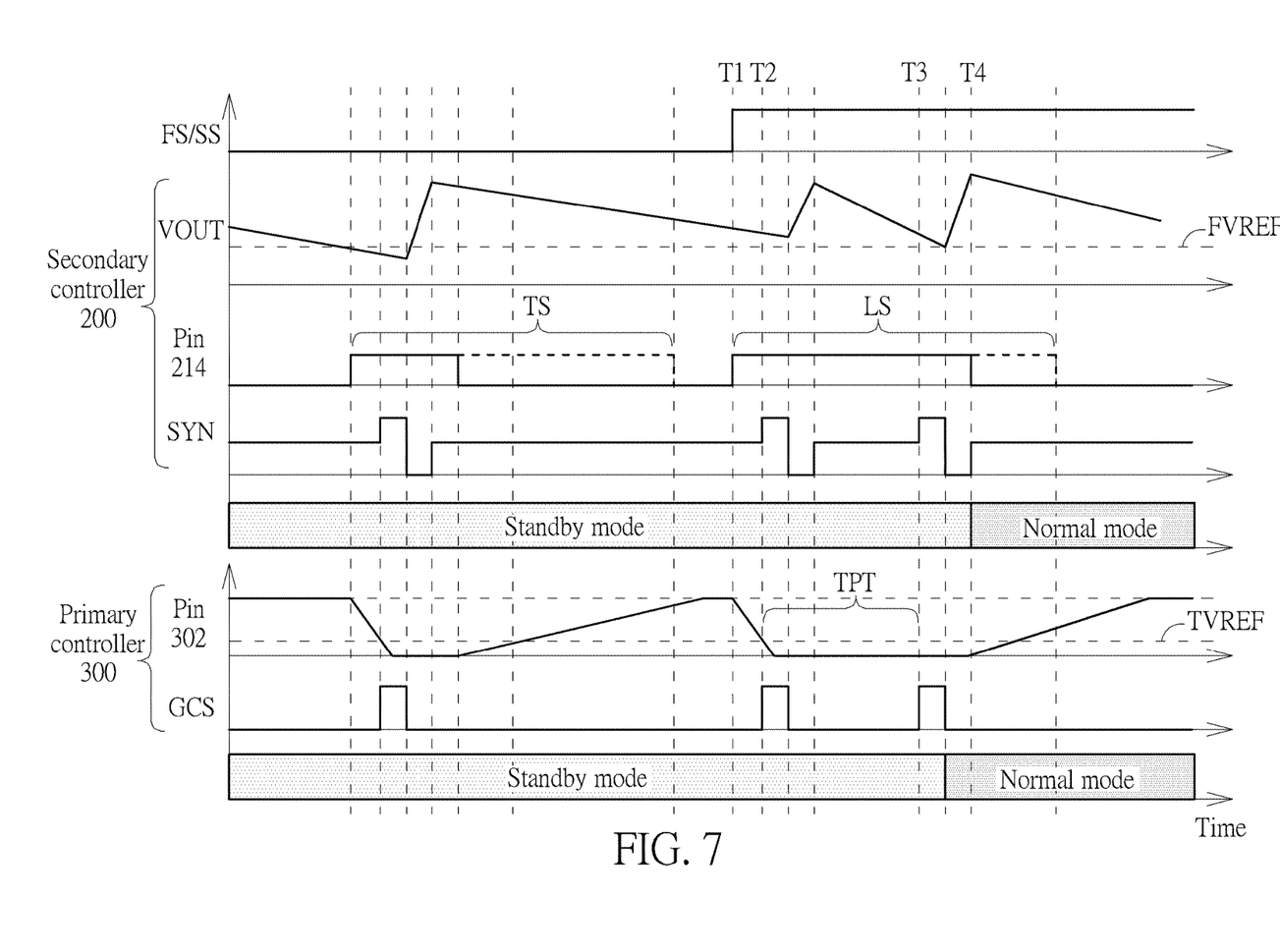

Please refer to FIG. 7. FIG. 7 is diagram illustrating operation timings of the primary controller 300 and the secondary controller 200 when the primary controller 300 and the secondary controller 200 enter the normal mode from the standby mode. As shown in FIG. 7, after the primary controller 300 and the secondary controller 200 enter the standby mode, when the detector 202 detects the first signal FS and the second signal SS at a time point T1, because the time point T1 is after the turning-on signal TS, the standby signal generation circuit 204 will generate the leaving signal LS to the primary controller 300 at the time point T1. As shown in FIG. 7, after the pin 302 of the primary controller 300 receives the corresponding signal corresponding to the leaving signal LS, when the corresponding signal corresponding to the leaving signal LS on the pin 302 is less than the third reference voltage TVREF (at a time point T2), the gate control signal generation circuit 304 generates the gate control signal GCS to the power switch 104. As shown in FIG. 7, when the corresponding signal corresponding to the leaving signal LS is less than the third reference voltage TVREF for the third predetermined time TPT, the gate control signal generation circuit 304 will generate the gate control signal GCS at a time point T3 and the primary controller 300 enters the normal mode from the standby mode according to the gate control signal GCS corresponding to the time point T3. Meanwhile, because the detector 202 of the secondary controller 200 also detects the synchronization signal SYN corresponding to the time point T3, the standby signal generation circuit 204 disables the leaving signal LS at a time point T4 according to the synchronization signal SYN corresponding to the time point T3. In addition, after the standby signal generation circuit 204 disables the leaving signal LS, the secondary controller 200 enters the normal mode from the standby mode.

Figure 8:
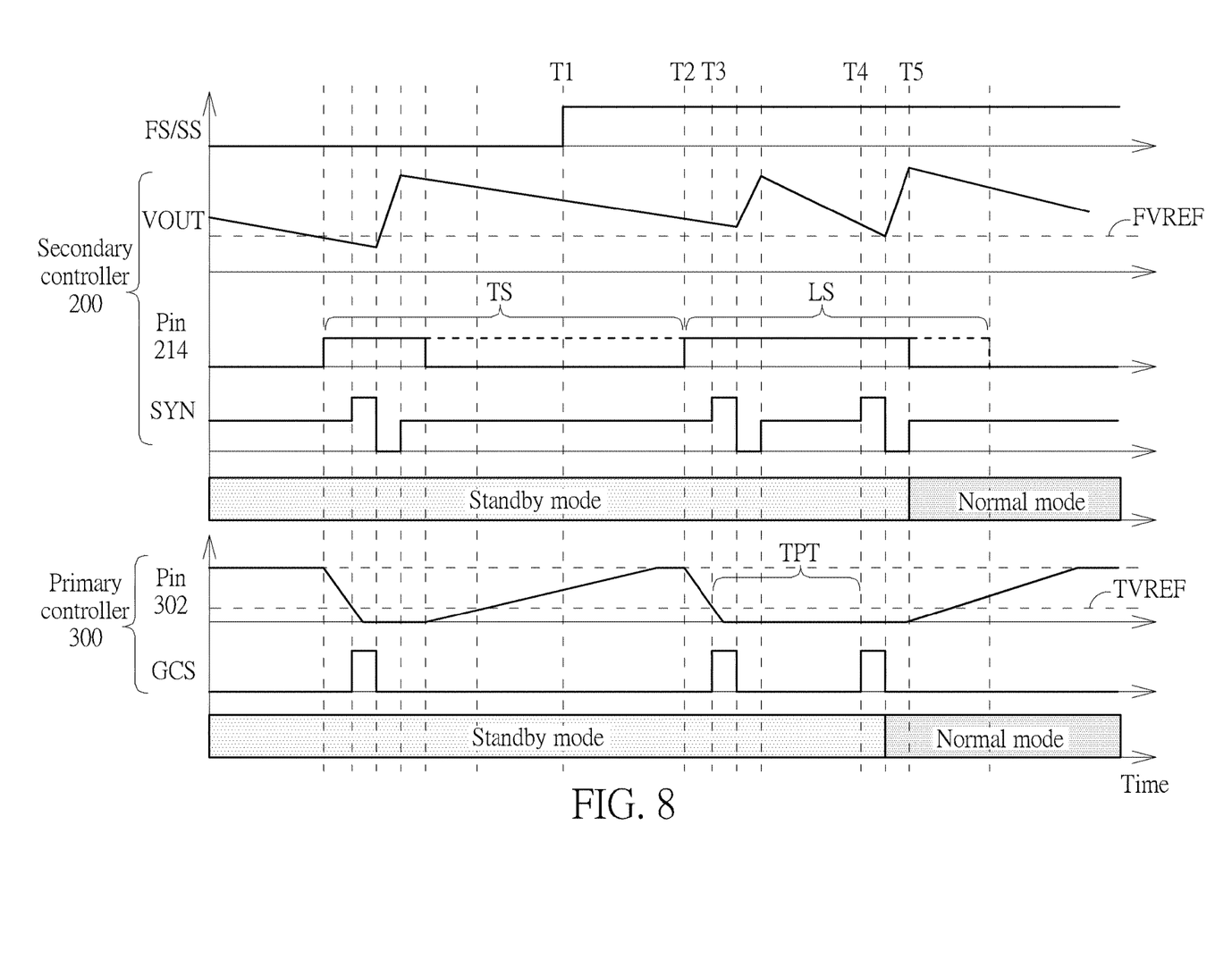

Please refer to FIG. 8. FIG. 8 is diagram illustrating operation timings of the primary controller 300 and the secondary controller 200 when the primary controller 300 and the secondary controller 200 enter the normal mode from the standby mode. As shown in FIG. 8, after the primary controller 300 and the secondary controller 200 enter the standby mode, when the detector 202 detects the first signal FS and the second signal SS at a time point T1, but because the time point T1 is within the turning-on signal TS, the standby signal generation circuit 204 will generate the leaving signal LS to the primary controller 300 after the turning-on signal TS (that is, at a time point T2). As shown in FIG. 8, after the pin 302 of the primary controller 300 receives the corresponding signal corresponding to the leaving signal LS, when the corresponding signal corresponding to the leaving signal LS on the pin 302 is less than the third reference voltage TVREF (at a time point T3), the gate control signal generation circuit 304 generates the gate control signal GCS to the power switch 104. As shown in FIG. 8, when the corresponding signal corresponding to the leaving signal LS is less than the third reference voltage TVREF for the third predetermined time TPT, the gate control signal generation circuit 304 will generate the gate control signal GCS at a time point T4 and the primary controller 300 enters the normal mode from the standby mode according to the gate control signal GCS corresponding to the time point T4. Meanwhile, because the detector 202 of the secondary controller 200 also detects the synchronization signal SYN corresponding to the time point T4, the standby signal generation circuit 204 disables the leaving signal LS at a time point T5 according to the synchronization signal SYN corresponding to the time point T4. In addition, after the standby signal generation circuit 204 disables the leaving signal LS, the secondary controller 200 enters the normal mode from the standby mode.

Figure 9A:
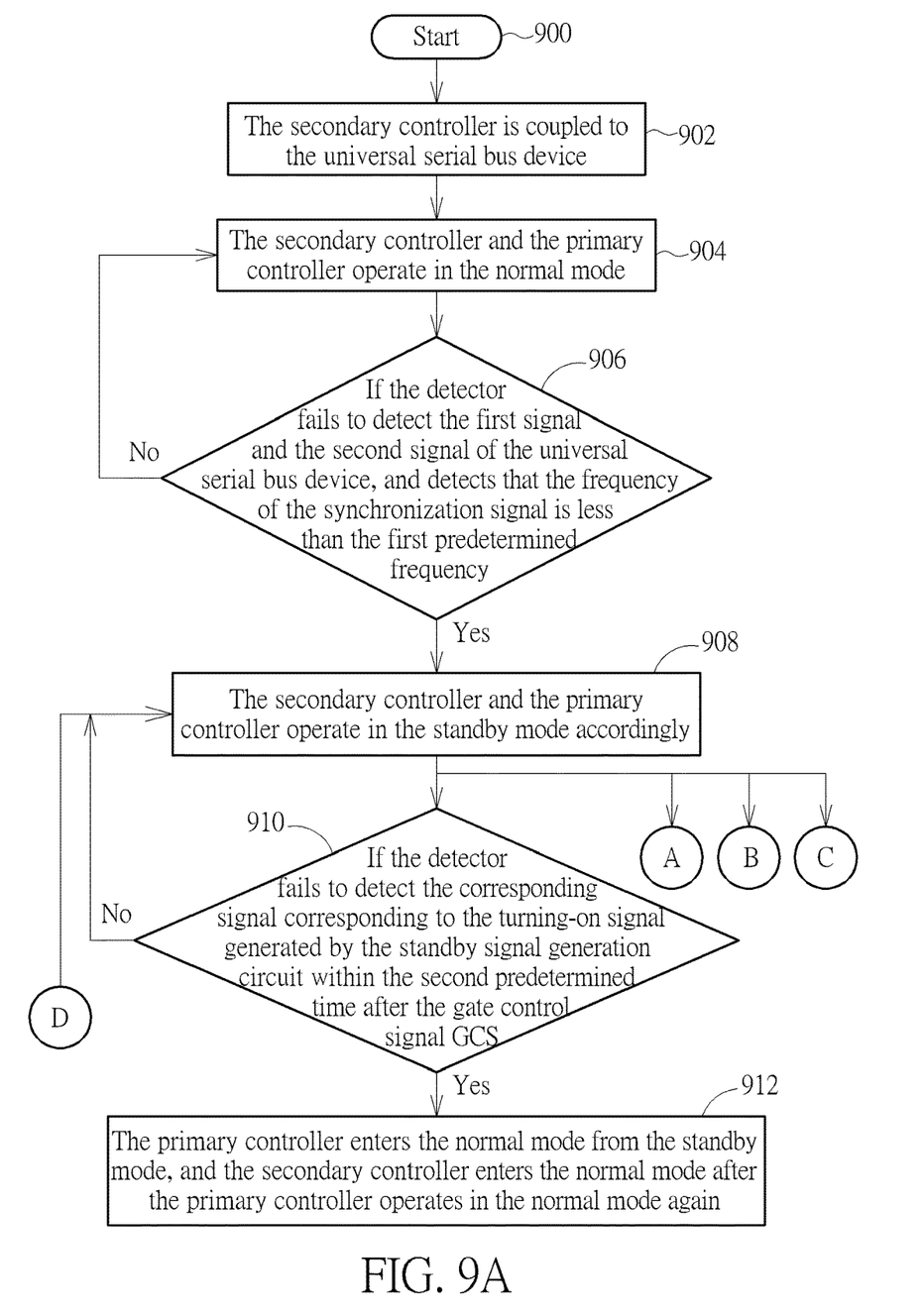
FIGS. 9A, 9B are a flowchart illustrating an operation method of a secondary controller applied to a secondary side of a power converter according to a second embodiment of the present invention.
Figure 9B:
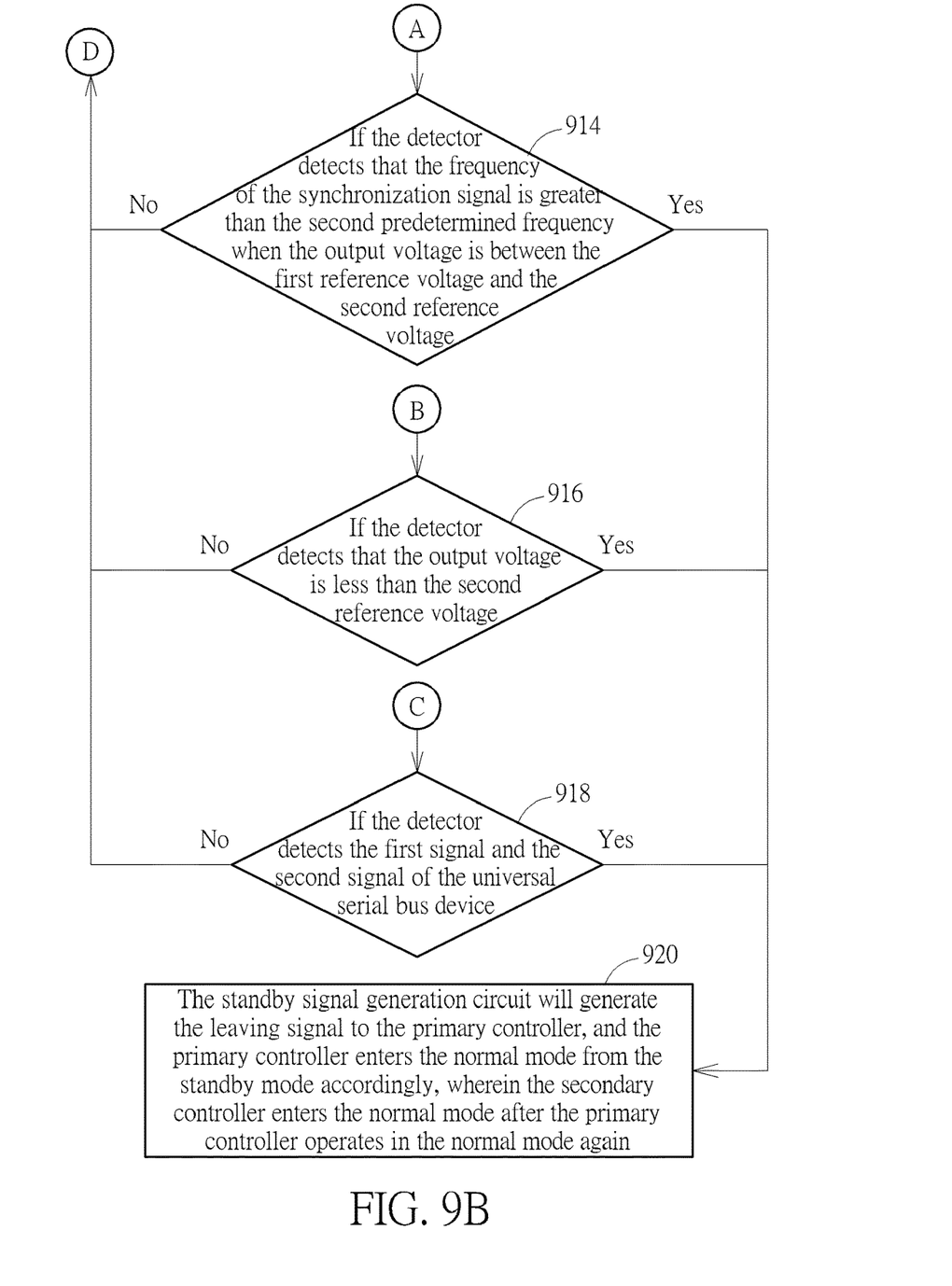

Please refer to FIGS. 1-2, 4-8, 9A, 9B. FIGS. 9A, 9B are a flowchart illustrating an operation method of a secondary controller applied to a secondary side of a power converter according to a second embodiment of the present invention. The operation method in FIGS. 9A, 9B is illustrated using the power converter 100, the secondary controller 200, and the primary controller 300 in FIG. 1. Detailed steps are as follows:

Step 900: Start.

Step 902: The secondary controller 200 is coupled to the universal serial bus device.

Step 904: The secondary controller 200 and the primary controller 300 operate in the normal mode.

Step 906: If the detector 202 fails to detect the first signal FS and the second signal SS of the universal serial bus device, and detects that the frequency of the synchronization signal SYN is less than the first predetermined frequency FPF; if yes, go to Step 908; if no, go to Step 904.

Step 908: The secondary controller 200 and the primary controller 300 operate in the standby mode accordingly, go to Step 910, Step 914, Step 916, and Step 918.

Step 910: If the detector 306 fails to detect the corresponding signal corresponding to the turning-on signal TS generated by the standby signal generation circuit 204 within the second predetermined time SPT after the gate control signal GCS; if yes, go to Step 912; if no, go to Step 908.

Step 912: The primary controller 300 enters the normal mode from the standby mode, and the secondary controller 200 enters the normal mode after the primary controller 300 operates in the normal mode again.

Step 914: If the detector 202 detects that the frequency of the synchronization signal SYN is greater than the second predetermined frequency when the output voltage VOUT is between the first reference voltage FVREF and the second reference voltage SVREF; if yes, go to Step 920; if no, go to Step 908.

Step 916: If the detector 202 detects that the output voltage VOUT is less than the second reference voltage SVREF; if yes, go to Step 920; if no, go to Step 908.

Step 918: If the detector 202 detects the first signal FS and the second signal SS of the universal serial bus device; if yes, go to Step 920; if no, go to Step 908.

Step 920: The standby signal generation circuit 204 will generate the leaving signal LS to the primary controller 300, and the primary controller 300 enters the normal mode from the standby mode accordingly, wherein the secondary controller 200 enters the normal mode after the primary controller 300 operates in the normal mode again.

In Step 902 and Step 904, when the secondary controller 200 is coupled to the universal serial bus device (not shown in FIG. 1), the secondary controller 200 and the primary controller 300 can make the power converter 100 operate in the normal mode.

In Step 908, however as shown in FIG. 2, when the universal serial bus device is disconnected to the secondary controller 200 at the time point T1, the detector 202 will fail to detect the first signal FS and the second signal SS of the universal serial bus device. Meanwhile, because the secondary side SEC of the power converter 100 is not coupled to the universal serial bus device, the frequency of the gate control signal GCS is reduced, and because the synchronization signal SYN corresponds to the gate control signal GCS, the frequency of the synchronization signal SYN is also reduced as the frequency of the gate control signal GCS is reduced. As shown in FIG. 2, when the detector 200 detects that the frequency of the synchronization signal SYN is less than less than the first predetermined frequency FPF, the standby signal generation circuit 204 will delay the first predetermined time FPT to generate the standby signal STS at the time point T2, wherein the standby signal STS is transmitted to the primary controller 300 through the pin 214 and the photocoupler 106 of the secondary controller 200, and the standby signal STS is a digital signal. But, in another embodiment of the present invention, the standby signal STS is an analog signal or a mixed-mode signal. In addition, as shown in FIG. 2, because the standby signal STS is transmitted to the primary controller 300 through the pin 214 and the photocoupler 106, the pin 302 of the primary controller 300 can receive the corresponding signal corresponding to the standby signal STS. As shown in FIG. 2, after the secondary controller 200 generates the standby signal STS, the secondary controller 200 enters the standby mode at the time point T3, and after the secondary controller 200 enters the standby mode, the secondary controller 200 will turn off the circuits within the secondary controller 200 other than the detector 202, the standby signal generation circuit 204, and the comparator 206.

In addition, as shown in FIG. 2, after the standby signal generation circuit 204 generates the standby signal STS, because the output voltage VOUT of the secondary side SEC of the power converter 100 is controlled by the secondary controller 200, the gate control signal generation circuit 304 of the primary controller 300 can generate the gate control signal GCS to boost the output voltage VOUT before the primary controller 300 enters the standby mode according to the standby signal STS, wherein the gate control signal GCS is transmitted to the power switch 104 through the pin 305 of the primary controller 300. Therefore, as shown in FIG. 2, the primary controller 300 will enter the standby mode at the time point T4.

In Step 912, as shown in FIG. 4, after the primary controller 300 and the secondary controller 200 enter the standby mode, if the output voltage VOUT is less than the under voltage lock out turning-off voltage UVLOOFF at the time point T1, the secondary controller 200 is turned off. Therefore, as shown in FIG. 4, after the gate control signal generation circuit 304 generates the gate control signal GCS to the power switch 104 at the time point T2 (because the corresponding signal corresponding to the turning-on signal TS on the pin 302 is less than the third reference voltage TVREF), if the detector 306 of the primary controller 300 fails to detect the corresponding signal corresponding to the turning-on signal TS generated by the standby signal generation circuit 204 within the second predetermined time SPT (e.g. 1 second) after the gate control signal generation circuit 304 generates the gate control signal GCS, the primary controller 300 will leave the standby mode to enter the normal mode at the time point T3. As shown in FIG. 4, after the primary controller 300 enters the normal mode, the output voltage VOUT starts to be increased. At the time point T4, when the output voltage VOUT is greater than the under voltage lock out turning-on voltage UVLOON, the secondary controller 200 is turned on to enter the normal mode again. In addition, after the primary controller 300 enters the standby mode, the primary controller 300 will turn off the circuits within the primary controller 300 other than the detector 306 and the gate control signal generation circuit 304.

In Step 914, as shown in FIG. 5, after the primary controller 300 and the secondary controller 200 enter the standby mode, when the detector 202 detects that the output voltage VOUT is between the first reference voltage FVREF and the second reference voltage SVREF and the frequency of the synchronization signal SYN is greater than the second predetermined frequency (e.g. 10 KHz), because that the frequency of the synchronization signal SYN is greater than the second predetermined frequency represents the secondary side SEC of the power converter 100 being coupled to a load, the standby signal generation circuit 204 of the secondary controller 200 can generate the leaving signal LS at the time point T3, wherein the leaving signal LS is transmitted to the primary controller 300 through the pin 214 and the photocoupler 106 of the secondary controller 200. As shown in FIG. 5, after the pin 302 of the primary controller 300 receives the corresponding signal corresponding to the leaving signal LS, when the corresponding signal corresponding to the leaving signal LS on the pin 302 is less than the third reference voltage TVREF (at the time point T4), the gate control signal generation circuit 304 can generate the gate control signal GCS to the power switch 104. As shown in FIG. 5, when the corresponding signal corresponding to the leaving signal LS is less than the third reference voltage TVREF for the third predetermined time TPT, the gate control signal generation circuit 304 can generate the gate control signal GCS at the time point T5 and the primary controller 300 leaves the standby mode to enter the normal mode according to the gate control signal GCS corresponding to the time point T5. Meanwhile, the standby signal generation circuit 204 can disable the leaving signal LS at the time point T6 according to the synchronization signal SYN corresponding to the time point T5. In addition, after the standby signal generation circuit 204 disables the leaving signal LS, the secondary controller 200 enters the normal mode from the standby mode.

In Step 916, as shown in FIG. 6, after the primary controller 300 and the secondary controller 200 enter the standby mode, if the output voltage VOUT is less than the second reference voltage SVREF within the turning-on signal TS, because that the output voltage VOUT is less than the second reference voltage SVREF represents the secondary side SEC of the power converter 100 being coupled to a heavy load (because the heavy load can make the output voltage VOUT be decreased rapidly), the standby signal generation circuit 204 of the secondary controller 200 will generate the leaving signal LS to the primary controller 300 after the turning-on signal TS (that is, at the time point T1). That is to say, if the output voltage VOUT is less than the second reference voltage SVREF within the turning-on signal TS, the standby signal generation circuit 204 still generates the leaving signal LS to the primary controller 300 after the turning-on signal TS (that is, at the time point T1). As shown in FIG. 6, after the pin 302 of the primary controller 300 receives the corresponding signal corresponding to the leaving signal LS, when the corresponding signal corresponding to the leaving signal LS on the pin 302 is less than the third reference voltage TVREF (at the time point T2), the gate control signal generation circuit 304 generates the gate control signal GCS to the power switch 104. As shown in FIG. 6, when the corresponding signal corresponding to the leaving signal LS is less than the third reference voltage TVREF for the third predetermined time TPT, the gate control signal generation circuit 304 generates the gate control signal GCS at the time point T3 and the primary controller 300 enters the normal mode from the standby mode according to the gate control signal GCS corresponding to the time point T3. Meanwhile, because the detector 202 of the secondary controller 200 also detects the synchronization signal SYN corresponding to the time point T3, the standby signal generation circuit 204 disables the leaving signal LS at the time point T4 according to the synchronization signal SYN corresponding to the time point T3. In addition, after the standby signal generation circuit 204 disables the leaving signal LS, the secondary controller 200 enters the normal mode from the standby mode.

In Step 918, as shown in FIG. 7, after the primary controller 300 and the secondary controller 200 enter the standby mode, when the detector 202 detects the first signal FS and the second signal SS at the time point T1, because the time point T1 is after the turning-on signal TS, the standby signal generation circuit 204 will generate the leaving signal LS to the primary controller 300 at the time point T1. As shown in FIG. 7, after the pin 302 of the primary controller 300 receives the corresponding signal corresponding to the leaving signal LS, when the corresponding signal corresponding to the leaving signal LS on the pin 302 is less than the third reference voltage TVREF (at the time point T2), the gate control signal generation circuit 304 generates the gate control signal GCS to the power switch 104. As shown in FIG. 7, when the corresponding signal corresponding to the leaving signal LS is less than the third reference voltage TVREF for the third predetermined time TPT, the gate control signal generation circuit 304 will generate the gate control signal GCS at the time point T3 and the primary controller 300 enters the normal mode from the standby mode according to the gate control signal GCS corresponding to the time point T3. Meanwhile, because the detector 202 of the secondary controller 200 also detects the synchronization signal SYN corresponding to the time point T3, the standby signal generation circuit 204 disables the leaving signal LS at the time point T4 according to the synchronization signal SYN corresponding to the time point T3. In addition, after the standby signal generation circuit 204 disables the leaving signal LS, the secondary controller 200 enters the normal mode from the standby mode.

In addition, as shown in FIG. 8, after the primary controller 300 and the secondary controller 200 enter the standby mode, when the detector 202 detects the first signal FS and the second signal SS at the time point T1, but because the time point T1 is within the turning-on signal TS, the standby signal generation circuit 204 will generate the leaving signal LS to the primary controller 300 after the turning-on signal TS (that is, at the time point T2). After the standby signal generation circuit 204 generates the leaving signal LS to the primary controller 300, operational principles of the primary controller 300 and the secondary controller 200 is the same as FIG. 7, so further description thereof is omitted for simplicity.

To sum up, the secondary controller and the operation method thereof can determine the universal serial bus device is disconnected to the secondary controller when the detector of the secondary controller fails to detect the first signal and the second signal of the universal serial bus device, and the detector of the secondary controller detects that the frequency of the synchronization signal corresponding to the primary side of the power converter is less than the first predetermined frequency. After the secondary controller and the operation method determines that the universal serial bus device is disconnected to the secondary controller, the secondary controller and the operation method can make the secondary controller and the primary controller enter the standby mode, wherein after the secondary controller and the primary controller enter the standby mode, the secondary controller and the primary controller only turn on circuits relative to the standby mode. Therefore, compared to the prior art, because after the secondary controller and the primary controller enter the standby mode, the secondary controller and the primary controller only turn on the circuits relative to the standby mode, when the universal serial bus device is disconnected to the secondary controller, the present invention can utilize the standby mode to make power consumption of the power converter, the primary controller, and the secondary controller be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary controller applied to a secondary side of a power converter, comprising:
   a detector for detecting a first signal and a second signal of a universal serial bus (USB) device and a frequency of a synchronization signal corresponding to a primary side of the power converter; and
   a standby signal generation circuit coupled to the detector for delaying a first predetermined time to generate a standby signal to a primary controller of the primary side of the power converter when the detector fails to detect the first signal and the second signal, and the frequency of the synchronization signal is less than a first predetermined frequency, wherein the primary controller enters a standby mode according to the standby signal.

2. The secondary controller of claim 1, wherein after the secondary controller generates the standby signal, the secondary controller enters the standby mode, and after the secondary controller enters the standby mode, the secondary controller turns off circuits within the secondary controller other than the detector, the standby signal generation circuit, and a comparator further comprised in the secondary controller.

3. The secondary controller of claim 1, wherein the first signal and the second signal are a differential signal pair.

4. The secondary controller of claim 1, wherein the standby signal is an analog signal, a digital signal, or a mixed-mode signal.

5. The secondary controller of claim 1, wherein when the detector detects the first signal and the second signal, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

6. The secondary controller of claim 1, further comprising:
a comparator for comparing an output voltage of the secondary side of the power converter with a first reference voltage, and comparing the output voltage with a second reference voltage after the detector detects a rising edge of the synchronization signal until the detector detects a falling edge of the synchronization signal.

7. The secondary controller of claim 6, wherein when the output voltage is between the first reference voltage and the second reference voltage, the comparator generates a comparison signal to the standby signal generation circuit, and the standby signal generation circuit generates a turning-on signal to the primary controller according to the comparison signal.

8. The secondary controller of claim 7, wherein after the standby signal generation circuit generates the turning-on signal to the primary controller, a gate control signal generation circuit of the primary controller generates a gate control signal to a power switch of the primary side of the power converter accordingly, and the power switch is turning-on and turning-off according to the gate control signal.

9. The secondary controller of claim 8, wherein after the gate control signal generation circuit generates the gate control signal, if a detector of the primary controller fails to detect a corresponding signal corresponding to the turning-on signal within a second predetermined time, the primary controller leaves the standby mode.

10. The secondary controller of claim 9, wherein after the primary controller enters the standby mode, the primary controller turns off circuits within the primary controller other than the detector and the gate control signal generation circuit of the primary controller.

11. The secondary controller of claim 6, wherein when the output voltage is less than the second reference voltage, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

12. The secondary controller of claim 6, wherein when the output voltage is between the first reference voltage and the second reference voltage and the frequency is greater than a second predetermined frequency, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

13. An operation method of a secondary controller applied to a secondary side of a power converter, wherein the secondary controller comprises a detector, a standby signal generation circuit, and a comparator, the operation method comprising:
the detector detecting a first signal and a second signal of a universal serial bus device and a frequency of a synchronization signal corresponding to a primary side of the power converter; and
the standby signal generation circuit delaying a first predetermined time to generate a standby signal to a primary controller of the primary side of the power converter when the detector fails to detect the first signal and the second signal, and the frequency of the synchronization signal is less than a first predetermined frequency, wherein the primary controller enters a standby mode according to the standby signal.

14. The operation method of claim 13, wherein after the secondary controller generates the standby signal, the secondary controller enters the standby mode, and after the secondary controller enters the standby mode, the secondary controller turns off circuits within the secondary controller other than the detector, the standby signal generation circuit, and the comparator.

15. The operation method of claim 13, wherein the first signal and the second signal are a differential signal pair.

16. The operation method of claim 13, wherein when the detector detects the first signal and the second signal, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

17. The operation method of claim 13, further comprising:
the comparator comparing an output voltage of the secondary side of the power converter with a first reference voltage, and comparing the output voltage with a second reference voltage after the detector detects a rising edge of the synchronization signal until the detector detects a falling edge of the synchronization signal.

18. The operation method of claim 17, wherein when the output voltage is between the first reference voltage and the second reference voltage, the comparator generates a comparison signal to the standby signal generation circuit, and the standby signal generation circuit generates a turning-on signal to the primary controller according to the comparison signal.

19. The operation method of claim 18, wherein after the standby signal generation circuit generates the turning-on signal to the primary controller, a gate control signal generation circuit of the primary controller generates a gate control signal to a power switch of the primary side of the power converter accordingly, and the power switch is turning-on and turning-off according to the gate control signal.

20. The operation method of claim 19, wherein after the gate control signal generation circuit generates the gate control signal, if a detector of the primary controller fails to detect a corresponding signal corresponding to the turning-on signal within a second predetermined time, the primary controller leaves the standby mode.

21. The operation method of claim 20, wherein after the primary controller enters the standby mode, the primary controller turns off circuits within the primary controller other than the detector and the gate control signal generation circuit of the primary controller.

22. The operation method of claim 17, wherein when the output voltage is less than the second reference voltage, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

23. The operation method of claim 17, wherein when the output voltage is between the first reference voltage and the second reference voltage and the frequency is greater than a second predetermined frequency, the standby signal generation circuit generates a leaving signal to the primary controller after a turning-on signal generated by thereof, and the primary controller leaves the standby mode accordingly, wherein the secondary controller leaves the standby mode as the primary controller leaves the standby mode.

* * * * *